Figure 1:
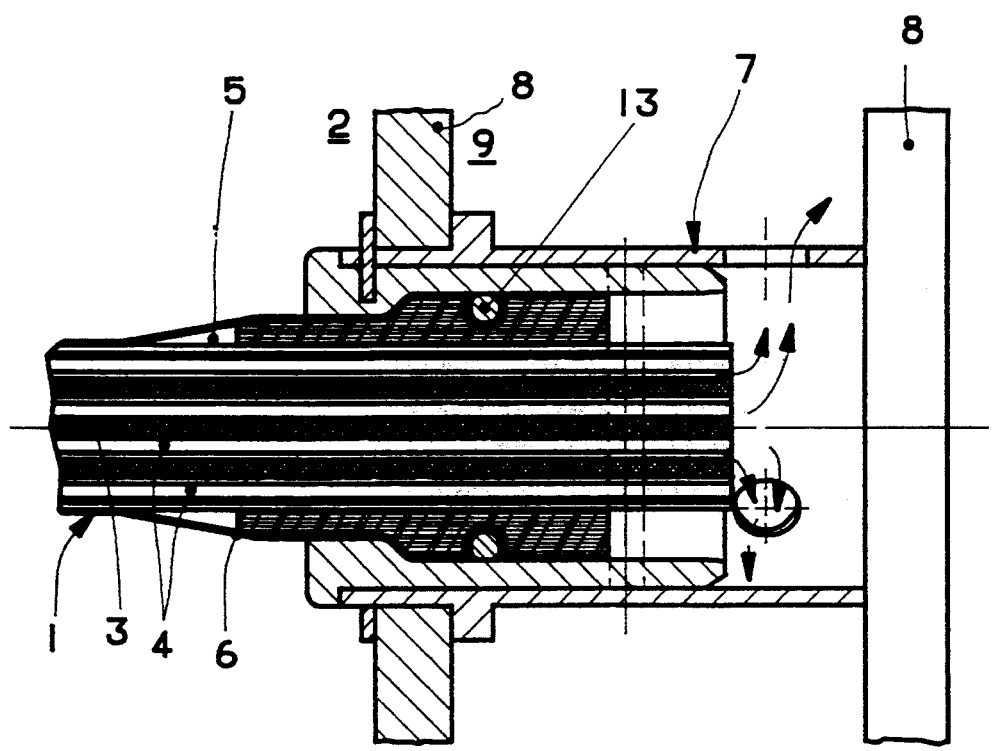

United States Patent [19]

Hartmann

[11] Patent Number: 5,401,409
[45] Date of Patent: Mar. 28, 1995

[54] TUBULAR KNITTED FILTER COVER AND PROCESS FOR PREVENTING RUNS

[75] Inventor: Eduard Hartmann, Schneisingen, Switzerland

[73] Assignee: Bucher-Guyer AG, Maschinenfabrik, Niederweningen, Switzerland

[21] Appl. No.: 50,076
[22] PCT Filed: Aug. 26, 1992
[86] PCT No.: PCT/CH92/00169
   § 371 Date: Apr. 27, 1993
   § 102(e) Date: Apr. 27, 1993
[87] PCT Pub. No.: WO93/04849
   PCT Pub. Date: Mar. 18, 1993

[30] Foreign Application Priority Data
   Sep. 12, 1991 [CH] Switzerland .......... 2684/91

[51] Int. Cl.6 ............................................. B01D 29/17
[52] U.S. Cl. .................. 210/494.3; 210/497.2; 210/506; 156/148; 156/181
[58] Field of Search ............... 210/494.1, 494.3, 497.2, 210/506; 156/73.2, 88, 148, 180, 181

[56] References Cited
U.S. PATENT DOCUMENTS

| | | | |
|---|---|---|---|
| 2,070,073 | 2/1937 | Walton | 210/494.1 |
| 2,659,958 | 11/1953 | Johnson | 156/88 |
| 2,907,095 | 10/1959 | Frey | 156/88 |
| 3,409,008 | 11/1968 | Mortensen et al. | 156/88 |
| 4,154,883 | 5/1979 | Elias | 156/88 |
| 4,473,432 | 9/1984 | Leader et al. | 156/88 |

FOREIGN PATENT DOCUMENTS 567043 9/1957 Italy ........................ 156/88

Primary Examiner—Robert A. Dawson
Assistant Examiner—W. L. Walker
Attorney, Agent, or Firm—Edmund M. Jaskiewicz

[57] ABSTRACT

At both ends of a filter cover (6), respectively in the fastening area of the filter cover on draining element (1), bondings or settings (12, 14, 15, 16, 17, 18, 19, 10, 21) of stitches (10) are applied, which are interrupted in one or more of first rows of stitches (11) and are offset in one or more rows of stitches at the end of the fastening area in the peripheral direction. In a modification, setting (22) of stitches (10) at the end of the fastening area is placed uninterrupted in the peripheral direction. These settings partially or completely allow runs in the fastening area of a filter cover (6), so that, on the one hand, an enlargement of filter cover (6) is made possible for the assembly, and, on the other hand, the formation of runs outside the fastening area is prevented.

13 Claims, 3 Drawing Sheets

TUBULAR KNITTED FILTER COVER AND PROCESS FOR PREVENTING RUNS

The invention relates to a process and a device for preventing runs in the knitted textile filter cover of a draining element, especially for fruit presses, by providing rigid setting or bonding of the stitches at the end of the filter cover.

Such draining elements are placed in the pressing space of a fruit press and serve the purpose of directing the extracted juice from the pressing space to separate juice collecting spaces. For this purposes, the rod-shaped, flexible core of the draining element is provided with longitudinal slots and surrounded by a knitted textile filter cover, through which the juice penetrates and is discharged along and through the longitudinal slots into the juice collecting space. The ends of each draining element are fastened in a detachable manner by drainage locks to the juice collecting plates, which, on the one hand, border the pressing space and, on the other hand, border the juice collecting spaces.

When assembling the draining element, a filter cover end is drawn over each rubber sleeve placed at the ends of the core and secured with an O-ring. This process is possible only with an expansion of the filter cover periphery. Because of the knitted type of production of the filter cover, stitches frequently become undone under lateral tensile stress at the filter cover end, and this unraveling or a run travels toward the inside to outside the drainage lock area and destroy the filter cover in this area or at least greatly reduces the filtering action. To avoid the formation of runs, the filter cover ends were previously already cut to length and set with a hot-wire cutting device. Nevertheless, runs always occur again in the case of careless assembly. The setting of the stitches by heat sealing prevents the formation of runs. But, on the other hand, it also eliminates the expandability of the filter cover end and thus makes the assembly more difficult or even make it impossible.

The object of the present invention is to prevent, at a relatively small cost, the formation of runs on the filter cover when it is assembled, without as a result adversely affecting the assembly.

According to the invention, this object is achieved in that at least partially runs are allowed in the fastening area of the filter cover and these runs are stopped at the end of the fastening area by setting or bonding the stitches.

So that runs may occur in limited numbers at the filter cover ends and are stopped again after a specific length, the setting of the stitches in one or more of the first rows of stitches is interrupted in peripheral direction and is placed offset in one or more rows of stitches at the end of the fastening area in peripheral direction.

In a preferred embodiment of the invention, the settings are made circular and placed in peripheral direction at every second stitch, and the settings at the end of the fastening area are offset by one stitch relative to the settings of the first row of stitches in the peripheral direction.

In various other modifications of the invention, the settings in the peripheral direction can be made straight, oblique, undulating, zigzagged or dotlike.

To achieve the greatest possible degree of expandability of the filter cover end, in another modification, runs are allowed without limiting their number, in the entire fastening area of the filter cover, and these runs are stopped at the end of the fastening area by a setting uninterrupted in peripheral direction.

The setting, viewed in the direction of the pressing space, is placed in front of the O-ring of the drainage lock.

To increase the wear resistance of the filter cover, according to another feature of the invention, the setting of the stitches is lengthened in the direction of the pressing space and extends over the entire area of the critical wear zone of the draining element.

An improvement of the wear behavior can also be achieved in that instead of the permanent setting within the wear zone, the filter cover is reinforced with a wear-resistant thread. In this case, runs are simultaneously also prevented, especially if the thread is a monothread or elastic thread.

The setting or bonding of the stitches advantageously takes place by ultrasonic welding or hot air welding.

For round or dotlike settings, the use of nozzle-shaped devices for hot-air or spray gluing of the stitches is especially well-suited.

The advantages achieved with the invention consist especially in the fact that by the arrangement of the stitch settings according to the invention, the formation of runs in the filtering area of the filter cover is no longer possible. On the other hand, runs are allowed at the filter cover end in limited number and/or length, so that the expandability of the filter cover end remains and the assembly of the filter cover is facilitated.

Figure 2:
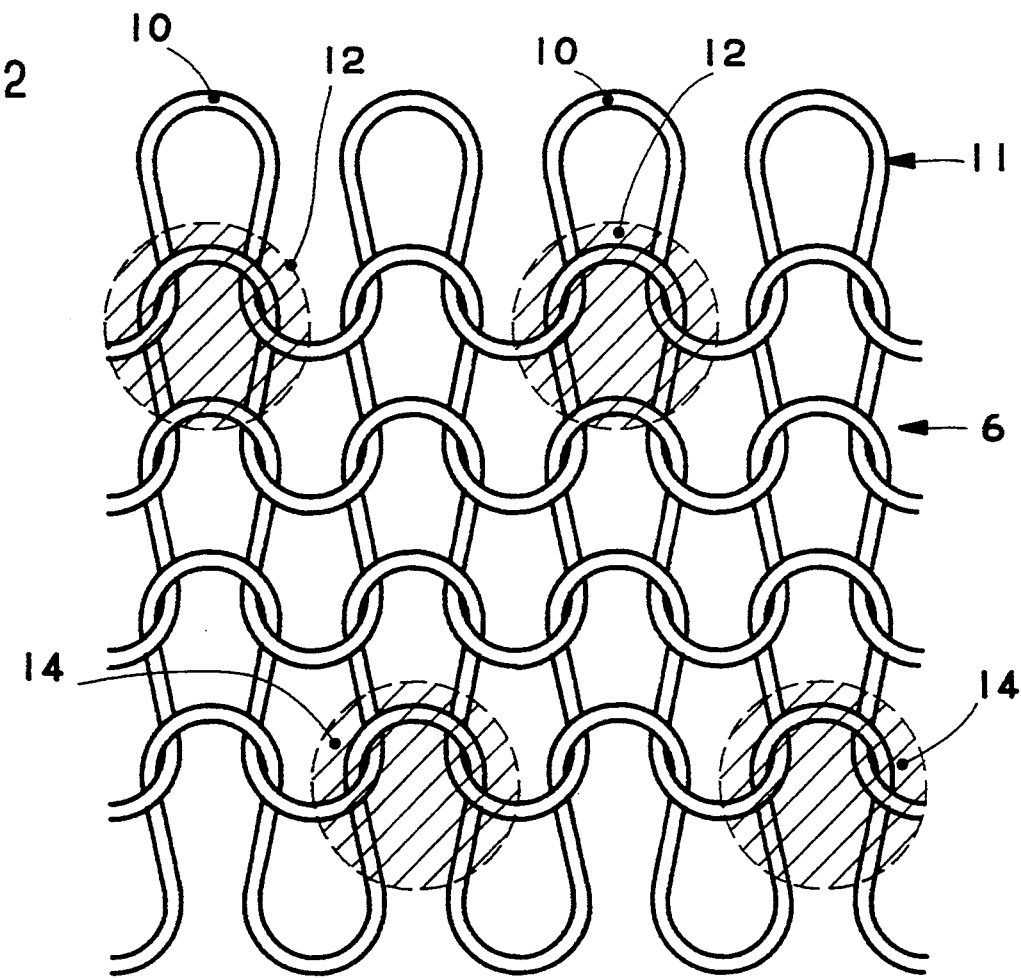
Figure 3:
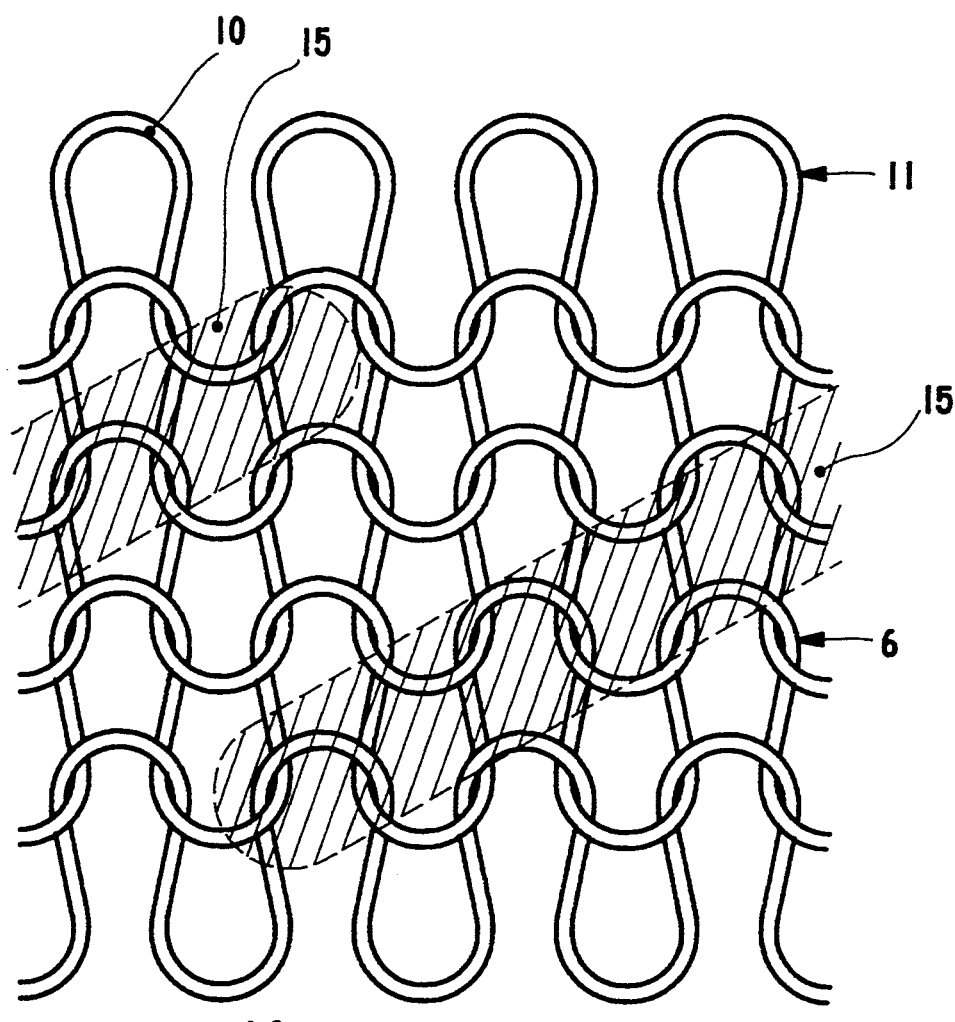
Figure 4:
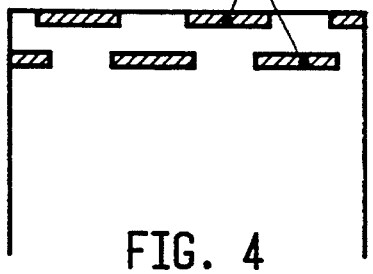
Figure 5:
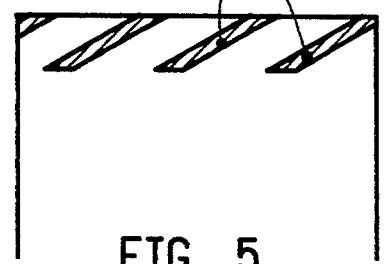
Figure 6:
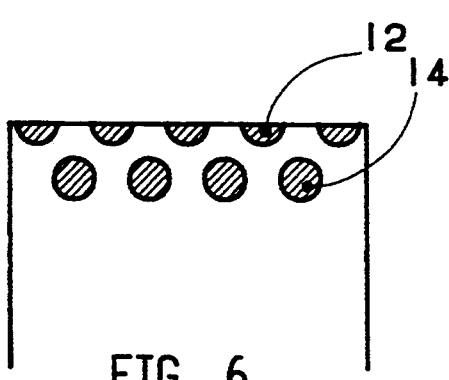
Figure 7:
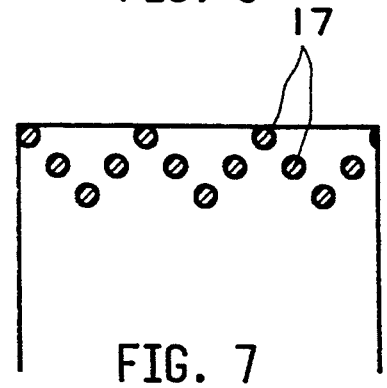
Figure 8:
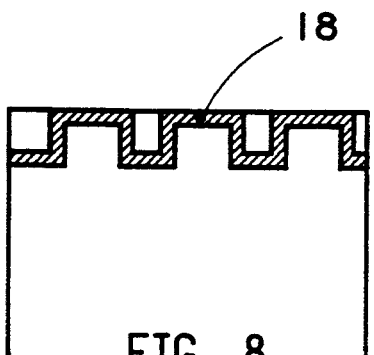
Figure 9:
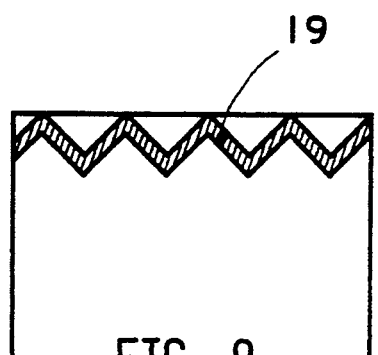
Figure 10:
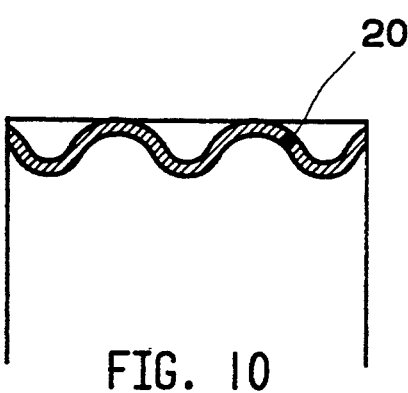
Figure 11:
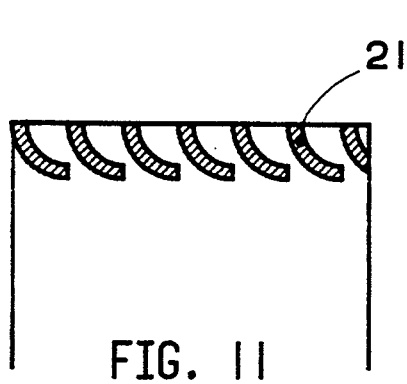
Figure 12:
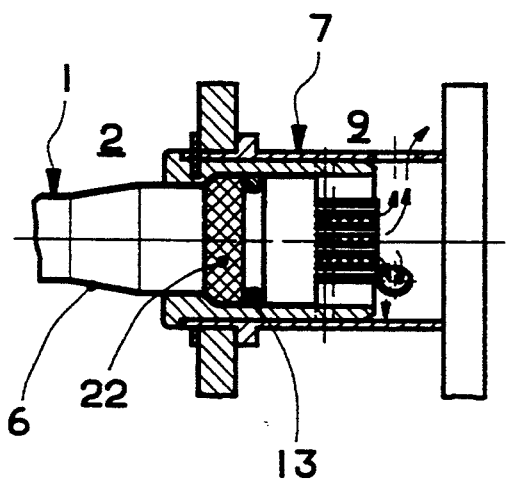
Figure 13:
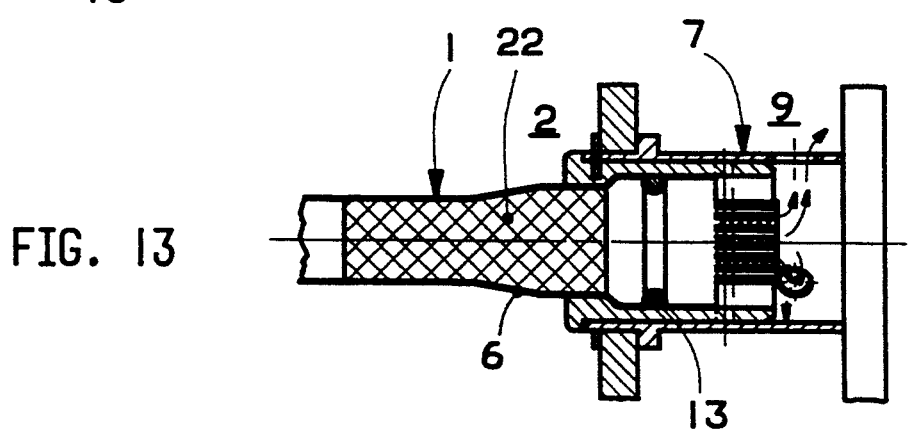

The invention is explained in more detail in the following description and the drawing, which shows several modifications in diagrammatic representation. There are shown in:

FIG. 1 a longitudinal section through a draining element with assembled filter cover, FIG. 2 an enlarged view of the knitted filter cover with circular settings of the stitches, FIG. 3 the filter cover according to FIG. 2 with settings running obliquely, FIG. 4 a diagrammatic representation of settings running rectilinearly, FIG. 5 a diagrammatic representation of settings running obliquely, FIG. 6 a diagrammatic representation of an embodiment with dotlike settings, FIG. 7 the settings according to FIG. 6, but in a zigzag arrangement, FIG. 8 a diagrammatic representation of an embodiment with linear settings in a rectangular arrangement, FIG. 9 a diagrammatic representation of an embodiment with linear settings in a zigzag arrangement, FIG. 10 a diagrammatic representation of an embodiment with undulating settings, FIG. 11 a diagrammatic representation of an embodiment with curved settings, FIG. 12 another embodiment with a setting uninterrupted in peripheral direction, placed at the end of the fastening area, and FIG. 13 the setting according to FIG. 12 expanded to the entire area of the wear zone of the drainage element.

In FIG. 1, the end of a draining element 1 is shown, which is placed in pressing space 2 of a fruit press, not shown. Draining element 1 consists of a rod-shaped, flexible core 3, which on its periphery is provided with several longitudinal slots 4 for discharging the extracted juice. One rubber sleeve 5 each is permanently placed at the ends of draining element 1. Core 3 is surrounded by a tubular or hose-shaped, circular-knitted filter cover 6 made of synthetic or natural textile material, by which juice present in pressing space 2 penetrates and is filtered. The filtered juice penetrates a drainage lock 7 through longitudinal slots 4, drainage lock with which draining element 1 is fastened in a detachable manner to juice collecting plates 8, conveyed into adjacent juice collecting spaces 9.

To prevent the formation of runs at the ends of filter cover 6, stitches 10 of a first row of stitches 11 (FIG. 2) are connected permanently with one another with the subsequent stitches of the second row of stitches by circular settings or bondings 12. In the assembly, the end of filter cover 6 has to be enlarged, so that it can be positioned over rubber sleeve 5 and axially secured with an O-ring 13. To make this enlargement of filter cover 6 possible, in the modification according to FIG. 2, only every second stitch 10 of first row of stitches 11 is permanently connected with the stitches of the second row of stitches by settings 12. In this case, the stitches that are not set, lying between stitches 10, can be broken up and form a run. So that the run, which makes possible the enlargement of filter cover 6 at the end, does not continue over the fastening area of filter cover 6, settings 14 are provided at the end of the fastening area, which are placed offset by one stitch to settings 12 of first row of stitches 11 in peripheral direction and prevent the allowed run to continue. By this limited allowance of runs in the fastening area, on the one hand, the enlargement of filter cover 6 necessary for the assembly is made possible and, on the other hand, a continuous formation of runs is prevented.

The locally limited setting of the individual stitches takes place preferably by ultrasonic welding. This type of welding allows short cycle times with high welding quality and low cost. But other types of connection, such as hot air, contact welding, gluing, etc., can also be used. Circular settings 12 according to FIG. 2 make possible especially the use of nozzle-shaped devices, such as, e.g., hot-air or spray gluing.

In the embodiment according to FIG. 3, settings 15, interrupted in peripheral direction, run rectilinearly and obliquely to row of stitches 11 over several rows of stitches. In this case, setting 15 extends from first row of stitches 11 up to the end of the fastening area of filter cover 6. Since respectively the beginning and the end of a setting 15 overlap in peripheral direction, a continuous formation of runs beyond the fastening area of filter cover 6 is prevented.

FIG. 4 shows a diagrammatic representation of rectilinear settings 16, interrupted in peripheral direction and running parallel to row of stitches 11, which are placed offset to one another in lengthwise direction and peripheral direction of filter cover 6.

In FIGS. 5 and 6, settings 15 according to FIG. 3 and settings 12, 14 according to FIG. 2 are again diagrammatically represented.

In other modifications, dotlike settings 17 in zigzag arrangement (FIG. 7), rectilinear settings 18 in rectangular arrangement (FIG. 8), rectilinear settings 19 in zigzag arrangement (FIG. 9), undulating settings 20 (FIG. 10) and curved settings 21 (FIG. 11) can all be used. In all modifications, the settings in lengthwise direction cover the entire fastening area of filter cover 6, and an expansion of filter cover 6 in peripheral direction is made possible by a formation of runs limited according to number and length.

Another modification of the invention is shown in FIGS. 12 and 13. Setting 22 in this modification, viewed in the direction of pressing space 2, is placed in front of O-ring 13 and runs in the peripheral direction without interruption so as to be continuous. As a result, runs are allowed at the end of filter cover 6 which in this area make possible the enlargement of filter cover 6, but are stopped by setting 22. Since setting 22 lies directly in front of O-ring 13, the filtering action of filter cover 6 is not adversely affected by the runs.

FIG. 13 shows a modification in which setting 22 is lengthened beyond the critical wear zone of filter cover 6 in the direction of pressing space 2. Setting 22, which is preferably performed by hot air, brings about a reduction of wear of filter cover 6 in this area that is especially prone to wear. The outside fibers of filter cover 6 are set and are thus less susceptible to wear. Instead of setting 22, this wear zone can also be reinforced with an especially wear-resistant thread knitted into this area. The formation of runs is simultaneously also prevented by the use of a monofilament or elastic thread.

It will be understood that this invention is susceptible to modification in order to adapt it to different usages and conditions, and accordingly, it is desired to comprehend such modifications within this invention as may fall within the scope of the appended claims.

I claim:

1. A process for preventing runs in a tubular knitted textile filter cover of a draining element for presses for separating liquid from non-liquid materials, comprising the steps of bonding the stitches at the end of the knitted textile filter cover in the area thereof which is secured to a draining element, the bonded stitches being situated at the end of the securing area of the cover such that any runs which occur are terminated at the end of the securing area by the bonded stitches, the bonded stitches in at least a first row of stitches in a peripheral direction of the filter cover are interrupted and bonded stitches in subsequent rows are offset from the bonded stitches in the first rows.

2. A tubular knitted textile filter cover for an elongated rod-like draining element in presses for separating liquid from non-liquid materials comprising a plurality of peripherally extending rows of stitches, said filter cover having one end and an other end, there being an area at said one end which is to be secured to a draining element and there being a filtering area between said one and other ends, and means at said one end of said filter cover between said filtering and securing areas for preventing any runs which may occur at said one end within the securing area from extending beyond the securing area so as to maintain transverse expandability of the filter cover within the securing area.

3. A tubular knitted textile filter cover as claimed in claim 2 wherein said means for preventing comprises a bonding of stitches situated at the end of the securing area of the filter cover to define bonded stitches.

4. A tubular knitted textile filter cover as claimed in claim 3 wherein the bonded stitches in at least a first row of stitches in a peripheral direction are interrupted and bonded stitches in subsequent rows are offset from the bonded stitches in the first rows.

5. A tubular knitted textile filter cover as claimed in claim 4 wherein the bonding of stitches is circular and disposed peripherally at every second stitch, the bondings at the end of the securing area being offset by one stitch in a peripheral direction with respect to bondings of a preceding row of stitches.

6. A tubular knitted textile filter cover as claimed in claim 3 wherein said bonding comprises a plurality of successive stitches and extends continuously to define a band in a peripheral direction at an end of the securing area such that runs occurring at within the securing area are terminated at the end of the securing area.

7. A tubular knitted textile filter cover as claimed in claim 6 wherein said bonding band is disposed in front of an O-ring which secures the filter cover to a lock of a draining element.

8. A tubular knitted textile filter cover as claimed in claim 3 wherein said bondings comprise a plurality of stitches and each said bonding extends rectilinearly parallel to the rows of stitches, said bondings are interrupted in a peripheral direction and overlap in the lengthwise direction of the filter cover.

9. A tubular knitted textile filter cover as claimed in claim 3 wherein a said bonding comprises a plurality of stitches and each said bonding extends obliquely over several rows of stitches and is interrupted in a peripheral direction.

10. A tubular knitted textile filter cover as claimed in claim 3 wherein said bondings each comprise a dot.

11. A tubular knitted textile filter cover as claimed in claim 3 wherein said bondings are disposed in an undulating pattern in a peripheral direction and extend over a plurality of rows of stitches.

12. A tubular knitted textile filter cover as claimed in claim 3 wherein said bonding comprises a plurality of stitches and extends continuously in a predetermined pattern.

13. A tubular knitted textile filter cover as claimed in claim 3 wherein said bonding comprises a plurality of successive stitches and a plurality of adjoining rows of stitches extending over the area of the wear zone of the draining element.

* * * * *